US009885223B2

(12) United States Patent
Jandhyala et al.

(10) Patent No.: US 9,885,223 B2
(45) Date of Patent: Feb. 6, 2018

(54) METHODS FOR FORMULATING A CEMENT SLURRY FOR USE IN A SUBTERRANEAN SALT FORMATION

(71) Applicant: Halliburton Energy Services, Inc., Houston, TX (US)

(72) Inventors: Siva Rama Krishna Jandhyala, Pune (IN); Krishna Ravi, Kingwood, TX (US); Sandip Prabhakar Patil, Pune (IN); Krishna Babu Yerubandi, Houston, TX (US); Abhimanyu Deshpande, Pune (IN); Yogesh Ramesh Barhate, Pune (IN); Rahul Chandrakanth Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 284 days.

(21) Appl. No.: 14/429,919

(22) PCT Filed: May 30, 2014

(86) PCT No.: PCT/US2014/040245
§ 371 (c)(1),
(2) Date: Mar. 20, 2015

(87) PCT Pub. No.: WO2015/183307
PCT Pub. Date: Dec. 3, 2015

(65) Prior Publication Data
US 2016/0258246 A1  Sep. 8, 2016

(51) Int. Cl.
*E21B 33/14* (2006.01)
*E21B 33/13* (2006.01)
(Continued)

(52) U.S. Cl.
CPC .............. *E21B 33/14* (2013.01); *C04B 7/361* (2013.01); *C09K 8/42* (2013.01); *E21B 33/13* (2013.01);
(Continued)

(58) Field of Classification Search
CPC .......... E21B 33/14; E21B 33/13; E21B 47/08; E21B 47/0005; E21B 49/00; C04B 7/361;
(Continued)

(56) References Cited

U.S. PATENT DOCUMENTS

| 5,006,177 A | 4/1991 | Oberste-Padtberg |
| 5,309,999 A | 5/1994 | Cowan et al. |

(Continued)

FOREIGN PATENT DOCUMENTS

| WO | 2014052182 A1 | 4/2014 |
| WO | 2014070503 A1 | 5/2014 |

(Continued)

OTHER PUBLICATIONS

Website—Chandler Engineering "Model 4265 Ultrasonic Cement Analyzer" 2011.*

(Continued)

*Primary Examiner* — George Gray
(74) *Attorney, Agent, or Firm* — McDermott Will & Emery LLP

(57) ABSTRACT

Methods of formulating a cement slurry for use in a subterranean salt formation, including methods for formulating a cement slurry capable of providing long-term zonal isolation within a subterranean salt formation. The methods also take into account the effects of treatment fluids on the cement slurry, such as drilling fluids, spacer fluids, flush fluids, or other relevant fluids used to perform a subterranean formation operation.

20 Claims, 1 Drawing Sheet

(51) Int. Cl.
  *C09K 8/42*  (2006.01)
  *E21B 47/08* (2012.01)
  *C04B 7/36*  (2006.01)
  *G01V 1/40*  (2006.01)
  *E21B 49/00* (2006.01)

(52) U.S. Cl.
  CPC ............. *G01V 1/40* (2013.01); *E21B 47/08* (2013.01); *E21B 49/00* (2013.01)

(58) Field of Classification Search
  CPC ......... C04B 7/02; C04B 18/067; C04B 28/02; C04B 24/2682; G01V 1/40; C09K 8/42; C09K 8/487; Y02W 30/94
  See application file for complete search history.

(56) References Cited

U.S. PATENT DOCUMENTS

| | | |
|---|---|---|
| 6,626,243 B1 | 9/2003 | Go Boncan |
| 6,675,895 B1 | 1/2004 | Shehab et al. |
| 7,552,648 B2 | 6/2009 | McMechan et al. |
| 7,913,757 B2 | 3/2011 | Reddy et al. |
| 2007/0209796 A1 | 9/2007 | Santra et al. |
| 2012/0018154 A1 | 1/2012 | James |
| 2012/0298358 A1 | 11/2012 | Iverson et al. |

FOREIGN PATENT DOCUMENTS

| | | |
|---|---|---|
| WO | 2015183307 A1 | 12/2015 |
| WO | 2015183372 A1 | 12/2015 |

OTHER PUBLICATIONS

International Search Report for PCT/US2015/019677 dated Jun. 11, 2015.
Folsta et al., "Predicitng Salt Leaching During Drilling and Cementing Operations," SPE/IADC Drilling Conference and Exhibition held in Amsterdam, The Netherlands, Mar. 1-3, 2011, SPE/IADC 140242.
Gomez et al., "Cement Zonal Isolation to Control Salt and CO2 in Brazilian Ultra Deep Water Presalt Well of Santos Basin," Brasil Offshore Conference and Exhibition held in Macae, Brazil, Jun. 14-17, 2011, SPE 143772.
Simao et al., "Cementing in Front of Soluble Salt Zones," SPE Deepwater Drilling and Completions Conference held in Galveston, TX, Jun. 20-21, 2012, SPE 145719.
Jandhyala et al., "Cement Sheath Integrity in Fast Creeping Salts: Effect of Well Operations," SPE Offshore Europe Oil and Gas Conference and Exhibition held in Aberdeen, UK, Sep. 3-6, 2013, SPE 166622.
Dawson, Paul R., Constitutive Models Applied in the Analysis of Creep of Rock Salt, SAND-0137 (Apr. 1979).
PUC-Rico, Certificate Digital No. 1012301/CA, "Salt Creep Theory", not dated.
International Search Report and Written Opinion for PCT/US2014/040245 dated Feb. 25, 2015.

* cited by examiner

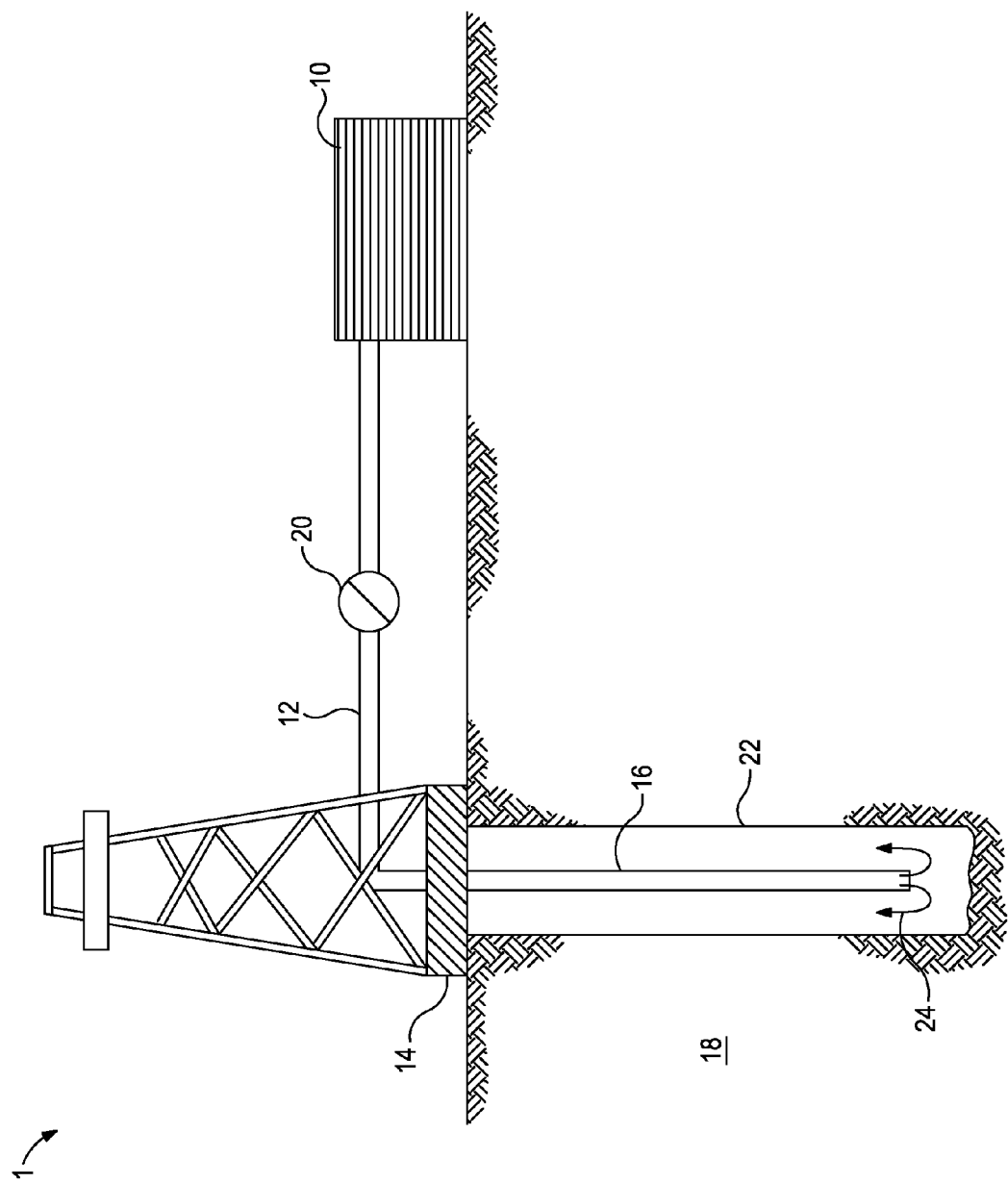

METHODS FOR FORMULATING A CEMENT SLURRY FOR USE IN A SUBTERRANEAN SALT FORMATION

BACKGROUND

The embodiments herein relate to methods for formulating a cement slurry for use in a subterranean salt formation, and, more particularly, to methods for formulating a cement slurry capable of providing long-term zonal isolation within a subterranean salt formation.

Subterranean formation operations (e.g., stimulation operations, sand control operations, completion operations, etc.) often involve drilling a wellbore in a subterranean formation with a drilling fluid (and thereafter placing a cement sheath between the formation and a casing (or liner string) in the wellbore. The cement sheath is formed by pumping a cement slurry through the bottom of the casing and out through an annulus between the outer casing wall and the formation face of the wellbore. The cement slurry then cures in the annular space, thereby forming a sheath of hardened cement that, inter alia, supports and positions the casing in the wellbore and bonds the exterior surface of the casing to the subterranean formation. This process is referred to as "primary cementing." Among other things, the cement sheath may keep fresh water reservoirs from becoming contaminated with produced fluids from within the wellbore. As used herein, the term "fluid" refers to liquid phase fluids and gas phase fluids. The cement sheath may also prevent unstable formations from caving in, thereby reducing the chance of a casing collapse and/or stuck drill pipe. Finally, the cement sheath forms a solid barrier to prevent fluid loss or contamination of production zones. The degree of success of a subterranean formation operation involving placement of a cement sheath, therefore, depends, at least in part, upon the successful cementing of the wellbore casing and the cement's ability to maintain zonal isolation of the wellbore.

Subterranean salt formations are often rich in hydrocarbons or other desirable fluids for production to the surface. As used herein, the term "subterranean salt formation" refers to a rock formation composed substantially (i.e., largely but not necessarily wholly) of salt. A variety of salts may be found in a salt formation including, but not limited to, halite, sylvite, bichofite, carnalite, polyhalite, tachydrite, anhydrite, and any combination thereof. However, drilling and cementing in such salt formations may be problematic due to salt creep, for example. As used herein, the term "salt creep" refers to the phenomenon of salt in a formation under stress to deform significantly as a function of time, depending on the loading conditions, and its physical properties, which permits the salt to flow into the wellbore and replace the volume of formation removed by the drill bit. Such replacement may reduce the size of the wellbore and/or may cause the drill pipe to stick and eventually force abandonment of the well. Additionally, during drilling, a drilling fluid may be circulated to and from a wellbore and salt from the formation may become dissolved in the drilling fluid, resulting in, among other things, wellbore opening (i.e., an increase in the radius/diameter of the wellbore), changes in the rheology of the drilling fluid, and the like.

During cementing, the cement slurry may interact with and dissolve at least a portion of the salts in the salt formation, thereby affecting the hydration properties and final cured properties of a cement slurry. For example, dissolution of salt in the cement slurry may influence such cement properties as, without limitation, free fluid, thickening time, compressive strength, rheological properties, and the like. In some cases, the influence of the salt dissolution by changing the geometry of the wellbore and the cement slurry properties may be particularly detrimental and may result in the failure of zonal isolation in a wellbore (e.g., by reducing the wellbore radius and through fluid invasion or other loss of structural integrity to the hydrating or cured cement). Failure of zonal isolation, among other things, may result in environmental contamination, which may cause harm to both flora and fauna, including humans. Such failure may further prevent production or reduce the production capability of a wellbore, which may result in abandonment of the wellbore or costly and time-consuming remedial actions.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the final cement slurries of one or more embodiments described herein to a downhole location.

DETAILED DESCRIPTION

The embodiments herein relate to methods for formulating a cement slurry for use in a subterranean salt formation, and, more particularly, to methods for formulating a cement slurry capable of providing long-term zonal isolation within a subterranean salt formation.

The methods described in the embodiments of the present disclosure permit an operator to determine whether a particular cement slurry formulation may be used in a particular subterranean salt formation to form a cement sheath. The methods described herein may further take into account specific job design, such as pumping time and pressure requirements, prior to introducing the cement slurry in the formation. Accordingly, based on the results of the determination, the cement slurry may be manipulated one or more times and re-evaluated to ensure that it is appropriate for the particular subterranean salt formation. Once an adequate cement slurry has been designed for use in the subterranean salt formation, the cementing operation may be performed with knowledge that the cement slurry will provide long-term zonal isolation. In some instances, other parameters, such as the drilling fluid, spacer fluid, flush fluid, or other relevant fluids used to perform a subterranean formation operation, or the duration of time the treatment fluid is used (e.g., drilling time), may be manipulated, as well as the cement slurry, or may be manipulated without manipulating the cement slurry, prior to introducing the cement slurry into the wellbore.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method is provided herein including calculating a theoretical first wellbore radius in a subterranean salt formation that would form as a result of using a treatment fluid in the formation. As used herein, the term "formation-treatment fluid" refers to a wellbore in a formation having a treatment fluid therein, or a modeled version thereof (e.g., for use in modeling fluids in the actual formation). The treatment fluid may be a drilling fluid, a pad fluid, a spacer fluid, a flush fluid, an acidizing fluid, and the like. The treatment fluid may be a Newtonian or a non-Newtonian fluid, without departing from the scope of the present disclosure. The theoretical first wellbore radius is determined based on salt creep analysis of the wellbore in the presence of formation-treatment fluid, taking into account the actual parameters and composition of the proposed salt formation and the density of the treatment fluid and formation. The analysis may use a finite element technique or any other numerical solution technique or analytical/semi-analytical technique capable of solving the salt creep model equations along with constitutive relations for solid structures. As described herein, the methods of the present disclosure may be described with reference to the treatment fluid being a drilling fluid, but any such other treatment fluids used for other operations may be evaluated using the methods of the present disclosure.

The treatment fluid may be any fluid capable of use in the subterranean salt formation for performing an operation therein. In some embodiments, the treatment fluid may comprise a base fluid selected from the group consisting of an oil base fluid, an aqueous base fluid, an aqueous-miscible base fluid, a water-in-oil emulsion base fluid, an oil-in-water emulsion base fluid, and any combination thereof. Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous base fluids may include, but are not limited to, fresh water, saltwater (e.g., water containing one or more salts dissolved therein), brine (e.g., saturated salt water), seawater, and any combination thereof. Suitable aqueous-miscible base fluid may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid, and any combination thereof. Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsion base fluids, any mixture of the above may be used including the water being and/or comprising an aqueous-miscible base fluid. Generally, the base fluid may be from any source provided, for example, that it does not contain an excess of compounds that may undesirably affect the performance of the treatment fluid, such as being able to drill with it economically, fracture with it, suspend and remove drill cuttings, and the like.

In addition to the base fluid, the treatment fluid may additionally comprise one or more additives. Suitable additives may include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

A theoretical second wellbore radius is calculated next during a cementing operation using a proposed cement slurry, the theoretical second wellbore radius is also calculated based on salt creep analysis of the wellbore in the presence of the formation-cement slurry after the treatment fluid has been used in the formation, taking into account the actual parameters and composition of the proposed salt formation after use of the treatment fluid and the density of the cement slurry and formation. As used herein, the term "formation-cement slurry" refers to a wellbore in a formation having a liquid (i.e., not fully set) cement slurry therein, or a modeled version thereof (e.g., for use in modeling the cement slurry in the actual formation). The analysis may use a finite element technique or any other numerical solution technique or analytical/semi-analytical technique capable of solving the salt creep model equations along with constitutive relations for solid structures. As mentioned above, the wellbore may initially be the size of, for example, the drill bit used to form the wellbore in the salt formation. However, after time due to salt creep, at a point between the initial drilling of the formation and a cementing operation (prior to setting the cement or during "hydration"), the radius of the wellbore may decrease due to salt deformation and deposition on the formation walls during both the drilling phase, any other treatment phase, and the cementing phase. Accordingly, a shrinkage or closure of the wellbore may occur and is taken into account using the methods of the present disclosure. This procedure may also be extended to other fluids used in the wellbore such as, for example, circulating mud, spacer, and flush fluids that may be pumped into the wellbore before the cement slurry.

The proposed cement slurry may be used during an actual cementing operation after the proposed cement slurry has been optimized for the particular subterranean salt formation and job parameters using the methods described herein; that is, after a final cement slurry composition has been determined. As used herein, the term "cement slurry" may be collectively used to refer to both the proposed cement slurry and the final cement slurry of the present disclosure. The cementing operation, as described above, involves forming a cement sheath capable of withstanding a wellbore load to prevent failure of the cement sheath in the wellbore. As used herein, the term "formation-cement sheath" refers to a wellbore in a formation having a cement sheath therein (e.g., a casing that has been cemented using a cement sheath), or a modeled version thereof (e.g., for use in a cement sheath in the actual formation). The wellbore load may be calculated based on the particulars of the salt formation, the geometry of the wellbore, and the like. Typically, the wellbore load must be withstood by the cement sheath so that failure of zonal isolation does not occur. During the experimental portion of the methods described herein, the cement sheath may be referred to as a proposed cement sheath.

In some embodiments, the cement slurry may comprise an aqueous base fluid and a cementitious material. Any aqueous base fluid suitable for use in forming a curable cement slurry capable of use in a subterranean salt formation may be suitable for use in the embodiments described herein. In particular, the suitable aqueous base fluids for use in the proposed and final cement slurries discussed herein may be any aqueous base fluid suitable for use in the subterranean formation, as previously discussed, including, but not limited to, freshwater, saltwater, brine, seawater, and any combination thereof. Generally, the aqueous base fluid may be from any source provided, for example, that it does not contain an excess of compounds that may undesirably affect the performance of the proposed or final cement slurry or the pumpability thereof.

The cementitious material of the embodiments herein may be any cementitious material suitable for use in forming a curable cement slurry. In preferred embodiments, the cementitious material may be a hydraulic cement. Hydraulic cements harden by the process of hydration due to chemical reactions to produce insoluble hydrates (e.g., calcium hydroxide) that occur independent of the cement's water content (e.g., hydraulic cements can harden even under constantly damp conditions). Thus, hydraulic cements are preferred because they are capable of hardening regardless of the water content of a particular subterranean formation. Suitable hydraulic cements may include, but are not limited to Portland cement, Portland cement blends (e.g., Portland blast-furnace slag cement and/or expansive cement), non-Portland hydraulic cement (e.g., super-sulfated cement, calcium aluminate cement, and/or high magnesium-content cement), and any combination thereof. Generally, the cementitious material may be present in the cement slurries described herein to achieve a cement slurry density in the range of from a lower limit of about 9.0 pounds per gallon ("ppg"), 10 ppg, 11 ppg, 12 ppg, 13 ppg, 14 ppg, 15 ppg, 16 ppg, and 17 ppg to an upper limit of about 25 ppg, 24 ppg, 23 ppg, 22 ppg, 21 ppg, 20 ppg, 19 ppg, 18 ppg, and 17 ppg.

In some embodiments, the cement slurry may additionally comprise a pozzolanic material. Pozzolanic materials may aid in increasing the density and strength of the cementitious material. As used herein, the term "pozzolanic material" refers to a siliceous material that, while not being cementitious, is capable of reacting with calcium hydroxide (which may be produced during hydration of the cementitious material). Because calcium hydroxide accounts for a sizable portion of most hydrated hydraulic cements and because calcium hydroxide does not contribute to the cement's properties, the combination of cementitious and pozzolanic materials may synergistically enhance the strength and quality of the cement. Any pozzolanic material that is reactive with the cementitious material may be used in the embodiments herein. Suitable pozzolanic materials may include, but are not limited to silica fume, metakaolin, fly ash, diatomaceous earth, calcined or uncalcined diatomite, calcined fullers earth, pozzolanic clays, calcined or uncalcined volcanic ash, bagasse ash, pumice, pumicite, rice hull ash, natural and synthetic zeolites, slag, vitreous calcium aluminosilicate, and any combinations thereof. In some embodiments, the pozzolanic material may be present in an amount in the range of a lower limit of about 5%, 7.5%, 10%, 12.5%, 15%, 17.5%, 20%, 22.5%, 25%, 27.5%, 30%, and 32.5% to an upper limit of about 60%, 57.5%, 55%, 52.5%, 50%, 47.5%, 45%, 42.5%, 40%, 37.5%, 35%, and 32.5% by weight of the dry cementitious material.

In some embodiments, the cement slurry may further comprise any cement additive for use in forming a curable cement slurry. Cement additives may be added in order to modify the characteristics of the cement slurry, for example. Such cement additives include, but are not limited to, a defoamer; a cement accelerator; a cement retarder; a fluid-loss additive; a cement dispersant; a cement extender; a weighting agent; a lost circulation additive; and any combination thereof. The cement additives of the embodiments herein may be in any form, including dry form or liquid form.

The process of determining the theoretical first wellbore radius during exposure to the treatment fluid and the theoretical second wellbore radius during cementing with the proposed cement slurry is based on salt creep analysis in the presence of formation-treatment fluid and formation-liquid cement slurry, respectively. In addition, as described in more detail below, the theoretical thermal and thermo-mechanical properties of the proposed cement slurry are determined based on salt creep analysis in the presence of formation-hardened cement sheath. Salt creep can be divided into three distinct states: primary, secondary, and tertiary. Primary salt creep (also known as transient salt creep) is characterized by high deformation in a short period of time. As the treatment fluid or cement slurry is subjected to constant loading, the rate of deformation increases at a decreasing rate until it reaches a steady state of deformation, known as secondary salt creep. Secondary salt creep is the longest stage with respect to time and is where strain rate tends to become constant. Finally, tertiary salt creep is characterized at the point in which the rate of deformation increases exponentially until failure of salt is reached. Accordingly, tertiary salt creep causes a volume increase due to fracturing (e.g., microfracturing) in the formation and leads to material failure. The salt creep analysis performed in the methods of the present disclosure may preferably take into account only secondary salt creep, which is the most dominant and lengthy stage for preparation of a final cement slurry according to the embodiments herein. In other embodiments, however, tertiary salt creep may also be considered during the salt creep analyses described herein, particularly to evaluate different temperatures and stress loading. In yet other embodiments, primary salt creep may be used in the salt creep analyses; however, primary salt creep tends to be quite short lived and may have very little, if any, effect on the value of the theoretical first or second wellbore radius. Accordingly, the salt creep analysis may take into account secondary salt creep only, secondary and tertiary salt creep only, or all three stages of salt creep, without departing from the scope of the present disclosure.

Secondary salt creep can be determined using the following model:

$$\dot{\epsilon}_2 = A_1 \exp\left(\frac{-Q_1}{RT}\right)\left(\frac{S_2}{S_2^o}\right)^{n_1} + A_2 \exp\left(\frac{-Q_2}{RT}\right)\left(\frac{S_2}{S_2^o}\right)^{n_2} \quad \text{Model 1}$$

where $\dot{\epsilon}_2$ is the second invariant of deviatoric strain; $S_2$ is the second invariant of deviatoric creep strain; $Q_1$ is the activation energy for the first creep mechanism; $Q_2$ is the activation energy for the second creep mechanism; and $A_1$, $A_2$, $n_1$, $n_2$, and $S_2^o$ are material constants for the particular salt type in the formation. The material constants are determined using uni-axial and tri-axial creep tests on extracted salt formation cores. One of skill in the art will understand the tests to be performed, as no single standard procedure is available. As such, the material constants may be determined by one of skill in the art and the outcome generally depends greatly on the procedure followed during testing. Accordingly, it may be best to report results of uni- and tri-axial creep tests along with testing protocol. The stress and strain invariants are mathematically connected to individual stresses and strains, such relationships being available in any standard mechanical engineering textbook and known to those of skill in the art. There is no standard equation(s) for tertiary salt creep because it is a failure phenomenon, however, one of skill in the art will understand how to calculate such tertiary salt creep, if it is desired to be used in the methods described herein, based on such factors as the failing salt type, the amount of failing salt, and the like. While Model 1 is one of the salt creep models available, as known to those of skill in the art, for example, there are other models that may be used in the methods of the present disclosure. For example, some salt creep models are based on microscopic deformation mechanisms, while others are purely empirical or combinations thereof. The methods disclosed herein are not limited to use of the salt creep analysis defined by Model 1, but any existing or new models defining creeping phenomenon may be used, as the model itself does not affect the method followed, but merely changes the model equation used.

After determining the theoretical first and second wellbore radius, a rheology of the proposed cement slurry versus salt dissolution curve (which may be referred to herein as "rheology v. salt dissolution curve") is experimentally determined. A salt dissolution is presented as a percentage. Accordingly, the rheology of the proposed cement slurry and the percent of salt dissolution into the cement slurry vary together. As used herein, "rheology" refers to the flow of matter, particularly in the liquid or semi-liquid state. Certain rheology parameters may be used to determine the rheology of the treatment fluids and/or cement slurries of the present disclosure. Selection of the type of rheology parameters for use may depend on a number of factors including, but not limited to, the specific type and composition of the treatment fluid and/or cement slurry, the type and composition of the subterranean salt composition, and the like. Suitable rheology parameters that may be used in determining the various rheology curves disclosed herein, including those discussed below, include, but are not limited to, plastic viscosity, Bingham model yield point, Herschel-Bulkley model parameters, and any combination thereof.

The salt dissolution vs. rheology curve of the proposed cement slurry may be determined, for example, by providing a salt core designed to mimic the subterranean salt formation. The salt core may be prepared, such as by pouring salt in a test cell and compressing the salt into a core at about 15,000 psi, or the salt core may be an actual salt core from the formation. The salt core may then be attached to the shaft of a high-pressure, high-temperature ("HPHT") consistometer. Although use of an HPHT consistometer for determining the salt dissolution vs. rheology curve of the methods described herein may be used, other approaches may additionally be used, without departing from the scope of the present disclosure, that are capable of determining rheology of a treatment fluid (e.g., a drilling fluid) and a cement slurry having a known amount of salt dissolved therein. The proposed cement slurry may be mixed according to the American Petroleum Institute, Recommended Procedure 10B-2. The rheology of the proposed cement slurry is measured using a rheometer before subjecting it to salt dissolution and then transferred to the HPHT consistometer cup. The procedure for determining rheology may be dependent upon the particular type of rheometer used. The shaft with the salt core attached is immersed in the proposed cement slurry and conditioned in the HPHT consistometer under expected downhole temperature and pressure conditions for the expected contact time (i.e., based on the expected conditions and contact time for the actual cementing job). The rheology of the proposed cement slurry with dissolved salt is then measured after conditioning. The difference in the rheology of the proposed cement slurry before and after salt dissolution represents the effect of salt dissolution on the slurry and is used to form the rheology v. salt dissolution curve.

After determining the rheology vs. salt dissolution curve, either of the following two options may be pursued. First, ("Option 1") may be employed by determining experimentally a salt dissolution versus flow rate curve based on laboratory experiments and solving a convection-diffusion equation. To obtain salt dissolution vs. flow rate curve using Option 1, any method that combines experimentation and a convection-diffusion equation may be used in accordance with the methods described herein. In one such method, the following steps may be performed to determine the salt dissolution vs. flow rate curve. First, a shaped synthetic or extracted salt core of known weight that mimics the desired formation may be obtained. In some embodiments, the salt core may be cylindrical in shape, but any simple geometry that may be easily represented mathematically may be used in accordance with the methods described herein. Thereafter, either treatment fluid or cement slurry may be flowed across the core at a desired flow rate for a desired amount of time and then the remaining weight of the salt core may be determined to quantify the amount of salt dissolved. This weight calculation may be repeated using different flow rates and amounts of time, thereby experimentally obtaining a salt dissolution vs. flow rate curve. In some embodiments, temperature may be expected to be a factor in a particular subterranean formation; in such cases, the salt core may be subjected to expected temperatures to take into account temperature effects. These experiments thus take into account the amount of salt dissolution from the salt core as a factor of time, flow rate, concentration of salt in the core, concentration of salt in the treatment fluid and/or cement slurry, temperature, and other inherent diffusivity between the salt core and the treatment fluid and/or cement slurry.

However, the salt is also diffusing into the treatment fluid and/or cement slurry. As such, a combined convection-diffusion equation may be solved using the same flow rate conditions and core geometry as the experiments. Any convection-diffusion model known to those of skill in the art, with the benefit of the present disclosure, may be used according to the methods described herein. As an example, a suitable general convention-diffusion equation that may be used follows:

$$\frac{\partial c}{\partial t} = \nabla \cdot (D \nabla c) - \nabla \cdot (\vec{v} c) + R \qquad \text{Equation 1}$$

wherein c is the concentration of salt in the treatment fluid and/or cement slurry when it is flowing with a velocity (or flow rate), represented by $\vec{v}$ in the presence of some mass source or sink R, represented in the methods herein as the salt core (or formation) itself. Diffusivity is represented by the unknown D, which is back-fit in the equation such that the mathematical equation predicts the same amount of salt dissolution determined experimentally. The back-fit can be performed for various flow rates and at different temperatures. Accordingly, the salt dissolution (or diffusivity) vs. flow rate curve may be obtained. Simplified versions of Equation 1 may also be utilized, according to one of skill in the art. For any given flow rate (and temperature, if required), the salt dissolution value depends only on salt-fluid combinations (i.e., the type of salt formation and the composition of a treatment fluid and/or cement slurry) and, thus, the salt dissolution value mimics the actual salt dissolution that would be experienced in the wellbore of the actual formation.

Second, "Option 2" may be employed, involving calculating a maximum salt dissolution value based on thermodynamic salt dissolution, as known to those of skill in the art. Thermodynamic salt dissolution determines the maximum concentration of one species (e.g., salt concentration in the methods described herein) dissolved in a solvent in the presence of other species. For simple solutes dissolved in simple solvents, theoretical equations are available in standard textbooks addressing the laws of thermodynamics. For complex solute and solvent combinations, available literature addressing the laws of thermodynamics extend these simple equations, and are known and available to those of skill in the art. If such extended equations are required based on the solute and solvent combinations of the fluids (e.g., treatment fluid or cement slurry) used in the models described herein, the specific extended equation for such specific solute and solvent combinations would be used. For example, for pure halite dissolved in a cement slurry, the solute is NaCl and the solvent is water with a combination of calcium, silicon, aluminum, and magnesium species.

Next, regardless of whether Option 1 or Option 2 above are used, a theoretical final wellbore radius of the subterranean salt formation is calculated based on the theoretical first wellbore radius, the theoretical second wellbore radius, and salt dissolution. That is, the theoretical first wellbore radius, the theoretical second wellbore radius, and salt dissolution from the formation and into the treatment fluid and/or the proposed cement slurry are used as inputs to determine the theoretical final wellbore radius. The theoretical final wellbore radius is determined merely by simple addition and subtraction of the wellbore opening and closing, respectively, as determined by theoretical first and second wellbore radii and salt dissolution. This theoretical final wellbore radius takes into account both the theoretical first and second wellbore radius and the effects of salt dissolution, which as explained above, may result in an increased radius, as the salt flows from the formation and into the treatment fluid and/or cement slurry. However, after the cement slurry has fully hydrated into a cement sheath, the cement sheath is no longer able to accept dissolved salts and, thus, a theoretical final wellbore radius may be determined.

If Option 1 is used, next a rheology of the proposed cement slurry versus flow rate curve is determined, by taking into account both the rheology v. salt dissolution curve and the salt dissolution v. flow rate curve described previously. If Option 2 is used, flow rate is not relevant, as only the maximum salt dissolution possible was calculated using the thermodynamic salt dissolution model.

A second alternate series of steps may follow, regardless of whether Option 1 or Option 2 are selected previously—"Option 3" and "Option 4." Option 3 involves the ordered steps of: (a) theoretically determining the thermal and thermo-mechanical properties of the proposed cement slurry based on salt creep analysis in the presence of formation-cement sheath to determine whether the proposed cement sheath is capable of withstanding the wellbore load, (b) experimentally determining whether the proposed cement slurry, once set into a sheath, can actually withstand the wellbore load based on an ultrasonic cement analyzer ("UCA") strength test and actual thermal and thermo-mechanical properties of the proposed cement slurry after salt dissolution, as explained above, (c) theoretically determining a theoretical pump pressure and pump time for the treatment fluid and the proposed cement slurry based on a computational fluid dynamics model, wherein the theoretical pump pressure for the treatment fluid and the cement slurry is between the pore pressure and fracture gradient of the subterranean salt formation, and wherein the theoretical pump time for the treatment fluid and the proposed cement slurry is such that the proposed cement sheath is theoretically capable of forming a cement sheath without substantial premature curing, and (d) experimentally determining whether the theoretical pumping time for the treatment fluid and the proposed cement slurry will permit formation of the proposed cement sheath in the wellbore without substantial premature curing based on a thickening time test according to the American Petroleum Institute, Recommended Procedure 10B-2.

The theoretical thermal and thermo-mechanical properties of the proposed cement slurry based on salt creep analysis in the presence of formation-cement sheath is determined based on scientifically available historical data related to such properties of similar cement slurries that have been used in the past and tested. The theoretical thermal and thermo-mechanical properties based on historical data is compared against the wellbore load that is expected to be exerted on the cured cement sheath and if the proposed cement slurry is not expected to endure such loads without failure, the composition of the cement slurry may be manipulated and new theoretical thermal and thermo-mechanical properties determined based on historically available data from similarly composed, previously tested cement slurries.

Experimentally determining whether the proposed cement slurry, once set into a sheath, can actually withstand the wellbore load may be based on an ultrasonic cement analyzer ("UCA") strength test and actual thermal and thermo-mechanical properties of the cement sheath. The actual thermal and thermo-mechanical properties are determined by curing the cement slurry and performing a battery of tests to determine whether failure is likely. Such tests include, uniaxial experiments, triaxial experiments, tensile strength testing, thermal conductivity and specific heat and thermal expansion testing, and shrinkage testing. Such testing may be performed according to the American Society for Testing and Materials procedures D3148-02, D2664-95a, and D3148-02. Determining experimentally whether the proposed cement slurry, once set into a sheath, can actually withstand the wellbore load is particularly laborious and is preferably performed only after determining that the cement slurry is likely to withstand such load, thereby reducing the likelihood of having to repeat the step, although repeating the step does not depart from the scope of the present disclosure.

Theoretically determining a theoretical pump pressure and pump time for the treatment fluid and the proposed cement slurry based on a computational fluid dynamics model may utilize any such model known to those of skill in the art that are capable of predicting fluid flows. For example, a suitable model may utilize the Navier-Stokes equations, defining single-phase and/or multi-phase fluid flow of both miscible and immiscible fluids. These equations may further be simplified, without departing from the scope of the present invention, such as by utilizing Euler equations. Existing commercial software like ANSYS FLUENT®, available from Ansys, Inc. in Canonsburg, Pa. or COMSOL MULTIPHYSICS®, available from Comsol, Inc. in Burlington, Mass.

Option 4, which is merely a change in the order of operations compared to Option 3, involves the ordered steps of: (a) theoretically determining a theoretical pump pressure and pump time for the treatment fluid and the proposed cement slurry based on a computational fluid dynamics model, wherein the theoretical pump pressure for the treatment fluid and the cement slurry is between the pore pressure and fracture gradient of the subterranean salt formation, and wherein the theoretical pump time for the treatment fluid and the proposed cement slurry is such that the proposed cement sheath is theoretically capable of forming a cement sheath without substantial premature curing, (b) experimentally determining whether the theoretical pumping time for the treatment fluid and the proposed cement slurry will permit formation of the proposed cement sheath in the wellbore without substantial premature curing based on a thickening time test, (c) theoretically determining the thermal and thermo-mechanical properties of the proposed cement slurry based on salt creep analysis in the presence of formation-cement sheath to determine whether the proposed cement sheath is capable of withstanding the wellbore load, and (d) experimentally determining whether the proposed cement slurry, once set into a sheath, can actually withstand the wellbore load based on an ultrasonic cement analyzer test and actual thermal and thermo-mechanical properties of the proposed cement slurry after salt dissolution.

The thermal and thermo-mechanical properties of the proposed cement slurry based on salt creep analysis in the presence of formation-cement sheath to determine whether the proposed cement sheath is capable of withstanding the wellbore load may be calculated based on one or more of thermal conductivity, thermal diffusivity, tensile strength, compressive strength, hydration volume change, Young's modulus, and Poisson's ratio.

The computational fluid dynamics model used to determine the theoretical pump time and pressure of the treatment fluid and the proposed cement slurry to ensure that the proposed cement slurry may form a sheath without substantial premature curing may use as inputs the flow rate of the treatment fluid, the flow rate of the proposed cement slurry, the rheology of the treatment fluid, the rheology of the proposed cement slurry, the standoff profile, and the theoretical final wellbore radius. Often, the flow rate is dictated by the operator or wellbore owner, considering such factors as equipment limitations, the type and composition of the treatment fluid and proposed cement slurry (e.g., viscosity), the type of formation, and the like. The rheology of the treatment fluid and proposed cement may be based on the same rheology parameters used to form the curves described previously herein. Such rheology parameters may include, but are not limited to, plastic viscosity, Bingham model yield point, Herschel-Bulkley model parameters, and any combination thereof. As used herein, the term "standoff profile" refers to the space between the face of the subterranean salt formation and the casing string, in which the cement sheath is to be formed. In some embodiments, in addition to or in lieu of manipulating the proposed cement slurry at one or more steps in Option 3 or Option 4, as described in more detail below, the flow rate of the treatment fluid and/or proposed cement slurry may be manipulated and the computational fluid dynamics model repeated with the new flow rate to determine if the new flow rate permits the proposed cement slurry to form a sheath without substantial premature curing. For example, in some embodiments, mere manipulation of the flow rate of one or both of the treatment fluid and the proposed cement slurry may be sufficient without further manipulating the slurry.

The difference between Option 3 and Option 4, as stated above, is that either the ability of the proposed cement slurry to withstand the wellbore load after curing into a cement sheath is first theoretically (e.g., by performing calculations and modeling) and then experimentally tested, followed by determining the pumping pressure and time of the treatment fluid and/or proposed cement slurry is theoretically and then experimentally, or vice versa. In both cases, theoretical calculations are preferably made before experimental testing is performed for any given parameter (i.e., the ability of the cement sheath to withstand wellbore loads, or the pumping time and pressure). Performing the theoretical calculations before experimental testing allows an operator to manipulate the proposed cement slurry after one or both of steps (a) and (c). If Option 3 is selected, the proposed cement slurry may be manipulated after step (a) until the proposed cement sheath is theoretically capable of withstanding the wellbore load and/or after step (c) until the proposed cement sheath is capable of forming without substantial premature curing (e.g., cures in the desired location). If Option 4 is selected, the proposed cement slurry may be manipulated after step (a) until the proposed cement sheath is capable of forming without substantial premature curing and/or after step (c) until the proposed cement sheath is theoretically capable of withstanding the wellbore load (i.e., the proposed cement is manipulated after step (a) and/or (c) and then reexamined theoretically by repeating steps (a) and/or (c) based on the manipulated proposed cement slurry). Moreover, the proposed cement slurry may be manipulated multiple times after one or both of steps (a) and (c) in both options until a proposed cement slurry with desirable characteristics is achieved.

Ideally, the manipulation of the cement slurry at one or both of steps (a) and (c) may prevent repetition of the experimental steps of (b) and (d). In some embodiments, however, the cement slurry may be manipulated after one or both of steps (b) and (d). If Option 3 is selected, the proposed cement slurry many be manipulated after step (b) until the proposed cement slurry, once set into a sheath, can actually withstand the wellbore load and/or step (d) until the theoretical pumping time for the treatment fluid and the proposed cement slurry will permit formation of the proposed cement sheath in the wellbore without substantial premature curing based on a thickening time test. If Option 4 is selected, the proposed cement slurry may be manipulated after one or both of steps (b) until the theoretical pumping time for the treatment fluid and the proposed cement slurry will permit formation of the proposed cement sheath in the wellbore without substantial premature curing based on a thickening time test and/or (d) until the proposed cement slurry, once set into a sheath, can actually withstand the wellbore load. Ideally, the step of experimentally determining whether the proposed cement slurry, once set into a sheath, can actually withstand the wellbore load is performed only once, as the experimental test may be costly in terms of economics and time. Accordingly, in some embodiments, the proposed cement slurry may be manipulated after one or more of the steps in Option 3 or Option 4 without substantially affecting the thermal and thermo-mechanical properties (e.g., the integrity of the cured sheath), so as to avoid repeating once or more times the step of experimentally determining whether the cement slurry can form a cement sheath capable of withstanding the wellbore load.

In each case where the proposed cement slurry is manipulated at one or more of steps (a)-(d) of Option 3 or Option 4, the manipulated proposed cement slurry must be reevaluated to determine the rheology v. salt dissolution curve, the salt dissolution v. flow rate curve or the maximum salt dissolution as determined by thermodynamic salt dissolution, the rheology v. flow rate curve, if applicable (i.e., if Option 1 above is used), and the theoretical final wellbore radius, as discussed in detail previously. This is so because the results of those curves and/or parameters are needed to theoretically determine steps (a) and (c) of Option 3 and Option 4 (i.e., they provide inputs for later calculations).

The proposed cement slurry may be manipulated at any one or more stages, as described in the present disclosure, by altering one or more of the amount, type, presence, or absence of one or more components of the slurry (e.g., the base fluid, the cementitious material, the pozzolanic material, the cement additive, and any combination thereof). That is, in some embodiments, the type of base fluid may be changed or adjusted (e.g., adding fresh water to seawater). In other embodiments, a pozzolanic material may be added when it was not present before, the type of cementitious material may be completely changed or a new blend proposed, a cement additive may be removed or added from the treatment fluid, and the like. The combinations of changes are not limited and one of skill in the art, with the benefit of this disclosure, will understand how those changes will affect the proposed cement slurry, with an eye toward bringing into compliance with the model disclosed herein.

Finally, after manipulating the proposed cement slurry and/or the flow rate of the treatment fluid and/or the proposed cement slurry, as described herein, a final cement slurry is established. Accordingly, the final cement slurry may be designed such that it will actually withstand the wellbore loads in a particular subterranean salt formation and will not substantially cure prematurely in an undesirable location in the formation, both of which contribute to the integrity of the cement sheath and the ability of the sheath to maintain zonal isolation. A final pumping pressure and time for the treatment fluid and the final cement slurry may also be established. Thereafter, where the treatment fluid is a drilling fluid, for example, a wellbore may be drilled using the drilling fluid at the pumping time and pressure established for the drilling fluid and the cementing operation may be performed using the final cement slurry at the pumping time and pressure established for the final cement slurry. It should be noted that the pumping time and pressure for the treatment fluid and the final cement slurry need not be, but can be, equivalent.

In various embodiments, systems configured for preparing, transporting, and delivering the final cement slurries described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a final cement slurry prepared as described herein. The pump may be, for example, a high pressure pump or a low pressure pump, which may depend on, inter alia, the viscosity and density of the final cement slurry, the type of the cementing operation, and the like.

In some embodiments, the systems described herein may further comprise a mixing tank arranged upstream of the pump and in which the final cement slurry is formulated. In various embodiments, the pump (e.g., a low pressure pump, a high pressure pump, or a combination thereof) may convey the final cement slurry from the mixing tank or other source of the final cement slurry to the tubular. In other embodiments, however, the final cement slurry can be formulated offsite and transported to a worksite, in which case the final cement slurry may be introduced to the tubular via the pump directly from a transport vehicle or a shipping container (e.g., a truck, a railcar, a barge, or the like) or from a transport pipeline. In yet other embodiments, the final cement slurry may be formulated on the fly at the well site where components of the final cement slurry are pumped from a transport (e.g., a vehicle or pipeline) and mixed during introduction into the tubular. In any case, the final cement slurry may be drawn into the pump, elevated to an appropriate pressure, and then introduced into the tubular for delivery downhole.

FIG. 1 shows an illustrative schematic of a system that can deliver final cement slurry of the present invention to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a final cement slurry of the present invention may be formulated. Again, in some embodiments, the mixing tank 10 may represent or otherwise be replaced with a transport vehicle or shipping container configured to deliver or otherwise convey the final cement slurry to the well site. The final cement slurry may be conveyed via line 12 to wellhead 14, where the final cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the final cement slurry may subsequently return up the wellbore in the annulus between the tubular 16 and the wellbore 22 as indicated by flow lines 24. In other embodiments, the final cement slurry may be reverse pumped down through the annulus and up tubular 16 back to the surface, without departing from the scope of the disclosure. Pump 20 may be configured to raise the pressure of the final cement slurry to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement is introduced into an annulus between a tubular and the wellbore and returns to the wellhead through the tubular), and the like).

It is also to be recognized that the disclosed final cement slurries may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include Embodiment A and Embodiment B.

Embodiment A

A method comprising: (a) calculating a theoretical first wellbore radius in a subterranean salt formation having a treatment fluid therein based on salt creep analysis in the presence of formation-treatment fluid; (b) calculating a theoretical second wellbore radius in the subterranean salt formation during a cementing operation with a proposed cement slurry based on salt creep analysis in the presence of formation-cement slurry, wherein the cementing operation involves forming a proposed cement sheath within the wellbore, and wherein the proposed cement sheath must withstand a wellbore load to prevent failure of the cement sheath in the wellbore; (c) determining experimentally a rheology of the proposed cement slurry versus salt dissolution curve; (d) determining experimentally and based on a convection-diffusion equation a salt dissolution versus flow rate curve; (e) calculating a theoretical final wellbore radius in the subterranean salt formation based on the theoretical first wellbore radius, the theoretical second wellbore radius, and salt dissolution after forming the proposed cement sheath; (f) determining a rheology of the proposed cement slurry versus flow rate curve; (g) calculating theoretically whether the proposed cement sheath is capable of withstanding the wellbore load by calculating theoretical thermal and thermo-mechanical properties of the proposed cement slurry based on salt creep analysis in the presence of formation-cement sheath; (h) determining experimentally whether the proposed cement sheath is capable of withstanding the wellbore load based on an ultrasonic cement analyzer test and actual thermal and thermo-mechanical properties of the proposed cement slurry after salt dissolution; (i) calculating theoretically a theoretical pump time and a theoretical pump pressure for the treatment fluid and the proposed cement slurry based on a computational fluid dynamics model, wherein the theoretical pump pressure for the treatment fluid and the proposed cement slurry is between a pore pressure and a fracture gradient of the subterranean salt formation, and wherein the theoretical pump time for the treatment fluid and the proposed cement slurry is such that the proposed cement slurry will theoretically permit formation of the proposed cement sheath in the wellbore without substantial premature curing; (j) determining experimentally whether the theoretical pumping time for the treatment fluid and the proposed cement slurry will permit formation of the proposed cement sheath in the wellbore without substantial premature curing based on a thickening time test of the proposed cement slurry; (k) performing steps (g)-(h) before steps (i)-(j), or performing steps (i)-(j) before steps (g)-(h); (l) establishing a final cement slurry, a final pumping pressure and time for the treatment fluid, and a final pumping pressure and time for the cement slurry; (m) performing a wellbore operation with the treatment fluid using the final pumping time and pressure for the treatment fluid; and (n) performing the cementing operation with the final cement slurry using the final pumping time and pressure for the final cement slurry.

Embodiment A may have one or more of the following additional elements in any combination:

Element A1: Wherein step (k) comprises performing steps (g)-(h) before steps (i)-(j), and further comprising manipulating the proposed cement slurry after at least one of: step (g), and repeating steps (b)-(g) until the proposed cement sheath based on the proposed cement slurry that has been manipulated is theoretically capable of withstanding the wellbore load, step (h), and repeating steps (b)-(h) until the proposed cement sheath based on the proposed cement slurry that has been manipulated is experimentally capable of withstanding the wellbore load, step (i), and repeating steps (b)-(i) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing, and step (j), and repeating steps (b)-(j) until the theoretical pumping time experimentally permits formation of the proposed cement sheath in the wellbore with the proposed cement slurry that has been manipulated without substantial premature curing.

Element A2: Wherein step (k) comprises performing steps (i)-(j) before steps (g)-(h), and further comprising manipulating the proposed cement slurry after at least one of: step (i), and repeating steps (b)-(f) and (i) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing, step (j), and repeating steps (b)-(f) and (i)-(j) until the theoretical pumping time experimentally permits formation of the proposed cement sheath in the wellbore with the proposed cement slurry that has been manipulated without substantial premature curing, step (g), and repeating steps (b)-(f), (i)-(j), and (g) until the proposed cement sheath based on the proposed cement slurry that has been manipulated is theoretically capable of withstanding the wellbore load, and step (h), and repeating steps (b)-(f), (i)-(j), and (g)-(h) until the proposed cement sheath based on the proposed cement slurry that has been manipulated is experimentally capable of withstanding the wellbore load.

Element A3: Wherein the computational fluid dynamics model of step (i) is used to determine the theoretical pump time and pressure of the treatment fluid and the proposed cement slurry based on: a flow rate of the treatment fluid, a flow rate of the proposed cement slurry, rheology parameters of the treatment fluid, rheology parameters of the proposed cement slurry, a standoff profile, and the theoretical final wellbore radius.

Element A4: Wherein at least one of the flow rate of the treatment fluid and the flow rate of the cement slurry are manipulated and step (i) is repeated.

Element A5: Wherein the rheology parameters of the treatment fluid and the rheology parameters of the proposed cement slurry are selected from the group consisting of plastic viscosity, Bingham model yield point, Herschel-Bulkley model parameters, and any combination thereof.

Element A6: Wherein the theoretical thermal and thermo-mechanical properties of the proposed cement are calculated based on at least one of thermal conductivity, thermal diffusivity, tensile strength, compressive strength, hydration volume change, Young's modulus, and Poisson's ratio.

Element A7: Wherein the salt creep analysis is based on secondary salt creep; a combination of secondary salt creep and tertiary salt creep; or a combination of primary salt creep, secondary salt creep, and tertiary salt creep.

Element A8: Wherein rheology parameters of the proposed cement slurry are used in step (c) to determine experimentally the rheology of the proposed cement slurry versus salt dissolution curve, and wherein the rheology parameters are selected from the group consisting of plastic viscosity, Bingham model yield point, Herschel-Bulkley model parameters, and any combination thereof.

Element A9: Further comprising a wellhead with a tubular extending therefrom and into the wellbore, and a pump fluidly coupled to the tubular; and wherein step (n) is performed by introducing the final cement slurry into the wellbore through the tubular.

By way of non-limiting example, exemplary combinations applicable to Embodiment A include: combinations of A with A1 and A4; A with A1, A3, and A9; A with A1, A6, A7, and A8; A with A2, A3, A4, and A9; A with A2, A7 and A8; A2 with A6.

Embodiment B

A method comprising: (a) calculating a theoretical first wellbore radius in a subterranean salt formation having a treatment fluid therein based on salt creep analysis in the presence of formation-treatment fluid; (b) calculating a theoretical second wellbore radius in the subterranean salt formation during a cementing operation with a proposed cement slurry based on salt creep analysis in the presence of formation-cement slurry, wherein the cementing operation involves forming a proposed cement sheath within the wellbore, and wherein the proposed cement sheath must withstand a wellbore load to prevent failure of the cement sheath in the wellbore; (c) determining experimentally a rheology of the proposed cement slurry versus salt dissolution curve; (d) calculating a maximum salt dissolution value based on thermodynamic salt dissolution; (e) calculating a theoretical final wellbore radius in the subterranean salt formation based on the theoretical first wellbore radius, the theoretical second wellbore radius, and salt dissolution after forming the proposed cement sheath; (f) calculating theoretically whether the proposed cement sheath is capable of withstanding the wellbore load by calculating theoretical thermal and thermo-mechanical properties of the proposed cement slurry based on salt creep analysis in the presence of formation-cement sheath; (g) determining experimentally whether the proposed cement sheath is capable of withstanding the wellbore load based on an ultrasonic cement analyzer test and actual thermal and thermo-mechanical properties of the proposed cement slurry after salt dissolution; (h) calculating theoretically a theoretical pump time and a theoretical pump pressure for the treatment fluid and the proposed cement slurry based on a computational fluid dynamics model, wherein the theoretical pump pressure for the treatment fluid and the proposed cement slurry is between a pore pressure and a fracture gradient of the subterranean salt formation, and wherein the theoretical pump time for the treatment fluid and the proposed cement slurry is such that the proposed cement slurry will theoretically permit formation of the proposed cement sheath in the wellbore without substantial premature curing; (i) determining experimentally whether the theoretical pumping time for the treatment fluid and the proposed cement slurry will permit formation of the proposed cement sheath in the wellbore without substantial premature curing based on a thickening time test of the proposed cement slurry; (j) performing steps (f)-(g) before steps (h)-(i), or performing steps (h)-(i) before steps (f)-(g); (k) establishing a final cement slurry, a final pumping pressure and time for the treatment fluid, and a final pumping pressure and time for the cement slurry; (l) performing a wellbore operation with the treatment fluid using the final pumping time and pressure for the treatment fluid; and (m) performing the cementing operation with the final cement slurry using the final pumping time and pressure for the final cement slurry.

Embodiment B may have one or more of the following additional elements in any combination:

Element B1: Wherein step (j) comprises performing (f)-(g) before steps (h)-(i), and further comprising manipulating the proposed cement slurry after at least one of: step (f), and repeating steps (b)-(f) until the proposed cement sheath based on the proposed cement slurry that has been manipulated is theoretically capable of withstanding the wellbore load, step (g), and repeating steps (b)-(g) until the proposed cement sheath based on the proposed cement slurry that has been manipulated is experimentally capable of withstanding the wellbore load, step (h), and repeating steps (b)-(h) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing, and step (i), and repeating steps (b)-(i) until the theoretical pumping time experimentally permits formation of the proposed cement sheath in the wellbore with the proposed cement slurry that has been manipulated without substantial premature curing.

Element B2: Wherein step (j) comprises performing steps: (h)-(i) before steps: (f)-(g), and further comprising manipulating the proposed cement slurry after at least one of: step (h), and repeating steps (b)-(e) and (h) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing, step (i), and repeating steps (b)-(e) and (h)-(i) until the theoretical pumping time experimentally permits formation of the proposed cement sheath in the wellbore with the proposed cement slurry that has been manipulated without substantial premature curing, step (f), and repeating steps (b)-(e), (h)-(i), and (f) until the proposed cement sheath based on the proposed cement slurry that has been manipulated is theoretically capable of withstanding the wellbore load, and step (g), and repeating steps (b)-(e), (h)-(i), and (f)-(g) until the proposed cement sheath based on the proposed cement slurry that has been manipulated is experimentally capable of withstanding the wellbore load.

Element B3: Wherein the computational fluid dynamics model of step (h) is used to determine the theoretical pump time and pressure of the treatment fluid and the proposed cement slurry based on: a flow rate of the treatment fluid, a flow rate of the proposed cement slurry, a rheology of the treatment fluid, a rheology of the proposed cement slurry, a standoff profile, and the theoretical final wellbore radius.

Element B4: Wherein at least one of the flow rate of the treatment fluid and the flow rate of the cement slurry are manipulated and step (h) is repeated.

Element B5: Wherein the rheology parameters of the treatment fluid and the rheology parameters of the proposed cement slurry are selected from the group consisting of plastic viscosity, Bingham model yield point, Herschel-Bulkley model parameters, and any combination thereof.

Element B6: Wherein the theoretical thermal and thermomechanical properties of the proposed cement are calculated based on at least one of thermal conductivity, thermal diffusivity, tensile strength, compressive strength, hydration volume change, Young's modulus, and Poisson's ratio.

Element B7: Wherein the salt creep analysis is based on secondary salt creep; a combination of secondary salt creep and tertiary salt creep; or a combination of primary salt creep, secondary salt creep, and tertiary salt creep.

Element B8: Wherein rheology parameters of the proposed cement slurry are used in step (c) to determine experimentally the rheology of the proposed cement slurry versus salt dissolution curve, and wherein the rheology parameters are selected from the group consisting of plastic viscosity, Bingham model yield point, Herschel-Bulkley model parameters, and any combination thereof.

Element B9: Further comprising a wellhead with a tubular extending therefrom and into the wellbore, and a pump fluidly coupled to the tubular; and wherein step (m) is performed by introducing the final cement slurry into the wellbore through the tubular.

By way of non-limiting example, exemplary combinations applicable to Embodiment B include: B with B1 and B5; B with B1, B6, B7, and B9; B with B1, B3, and B8; B with B2, B4, B6, and B9; B with B2, B8, and B9; B with B6 and B7.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   (a) calculating a theoretical first wellbore radius in a subterranean salt formation having a treatment fluid therein based on salt creep analysis in the presence of formation-treatment fluid;
   (b) calculating a theoretical second wellbore radius in the subterranean salt formation during a cementing operation with a proposed cement slurry based on salt creep analysis in the presence of formation-cement slurry, wherein the cementing operation involves forming a proposed cement sheath within the wellbore, and wherein the proposed cement sheath must withstand a wellbore load to prevent failure of the cement sheath in the wellbore;
   (c) determining experimentally a rheology of the proposed cement slurry versus salt dissolution curve;
   (d) determining experimentally and based on a convection-diffusion equation a salt dissolution versus flow rate curve;

(e) calculating a theoretical final wellbore radius in the subterranean salt formation based on the theoretical first wellbore radius, the theoretical second wellbore radius, and salt dissolution expected after the proposed cement sheath is theoretically formed;
(f) determining a rheology of the proposed cement slurry versus flow rate curve;
(g) calculating theoretically whether the proposed cement sheath is capable of withstanding the wellbore load by calculating theoretical thermal and thermo-mechanical properties of the proposed cement slurry based on salt creep analysis in the presence of formation-cement sheath;
(h) determining experimentally whether the proposed cement sheath is capable of withstanding the wellbore load based on an ultrasonic cement analyzer test and actual thermal and thermo-mechanical properties of the proposed cement slurry after salt dissolution;
(i) calculating theoretically a theoretical pump time and a theoretical pump pressure for the treatment fluid and the proposed cement slurry based on a computational fluid dynamics model,
wherein the theoretical pump pressure for the treatment fluid and the proposed cement slurry is between a pore pressure and a fracture gradient of the subterranean salt formation, and
wherein the theoretical pump time for the treatment fluid and the proposed cement slurry is such that the proposed cement slurry will theoretically permit formation of the proposed cement sheath in the wellbore without substantial premature curing;
(j) determining experimentally whether the theoretical pumping time for the treatment fluid and the proposed cement slurry will permit formation of the proposed cement sheath in the wellbore without substantial premature curing based on a thickening time test of the proposed cement slurry;
(k) performing steps (g)-(h) before steps (i)-(j), or performing steps (i)-(j) before steps (g)-(h);
(l) establishing a final cement slurry, a final pumping pressure and time for the treatment fluid, and a final pumping pressure and time for the cement slurry;
(m) performing a wellbore operation with the treatment fluid using the final pumping time and pressure for the treatment fluid; and
(n) performing the cementing operation with the final cement slurry using the final pumping time and pressure for the final cement slurry.

2. The method of claim 1, wherein step (k) comprises performing steps (g)-(h) before steps (i)-(j), and
further comprising manipulating the proposed cement slurry after at least one of:
step (g), and repeating steps (b)-(g) until the proposed cement sheath based on the proposed cement slurry that has been manipulated is theoretically capable of withstanding the wellbore load,
step (h), and repeating steps (b)-(h) until the proposed cement sheath based on the proposed cement slurry that has been manipulated is experimentally capable of withstanding the wellbore load,
step (i), and repeating steps (b)-(i) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing, and
step (j), and repeating steps (b)-(j) until the theoretical pumping time experimentally permits formation of the proposed cement sheath in the wellbore with the proposed cement slurry that has been manipulated without substantial premature curing.

3. The method of claim 1, wherein step (k) comprises performing steps (i)-(j) before steps (g)-(h), and
further comprising manipulating the proposed cement slurry after at least one of:
step (i), and repeating steps (b)-(f) and (i) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing,
step (j), and repeating steps (b)-(f) and (i)-(j) until the theoretical pumping time experimentally permits formation of the proposed cement sheath in the wellbore with the proposed cement slurry that has been manipulated without substantial premature curing,
step (g), and repeating steps (b)-(f), (i)-(j), and (g) until the proposed cement sheath based on the proposed cement slurry that has been manipulated is theoretically capable of withstanding the wellbore load, and
step (h), and repeating steps (b)-(f), (i)-(j), and (g)-(h) until the proposed cement sheath based on the proposed cement slurry that has been manipulated is experimentally capable of withstanding the wellbore load.

4. The method of claim 1, wherein the computational fluid dynamics model of step (i) is used to determine the theoretical pump time and pressure of the treatment fluid and the proposed cement slurry based on: a flow rate of the treatment fluid, a flow rate of the proposed cement slurry, rheology parameters of the treatment fluid, rheology parameters of the proposed cement slurry, a standoff profile, and the theoretical final wellbore radius.

5. The method of claim 4, wherein at least one of the flow rate of the treatment fluid and the flow rate of the cement slurry are manipulated and step (i) is repeated.

6. The method of claim 4, wherein the rheology parameters of the treatment fluid and the rheology parameters of the proposed cement slurry are selected from the group consisting of plastic viscosity, Bingham model yield point, Herschel-Bulkley model parameters, and any combination thereof.

7. The method of claim 1, wherein the theoretical thermal and thermo-mechanical properties of the proposed cement slurry are calculated based on at least one of thermal conductivity, thermal diffusivity, tensile strength, compressive strength, hydration volume change, Young's modulus, and Poisson's ratio.

8. The method of claim 1, wherein the salt creep analysis is based on secondary salt creep; a combination of secondary salt creep and tertiary salt creep; or a combination of primary salt creep, secondary salt creep, and tertiary salt creep.

9. The method of claim 1, wherein rheology parameters of the proposed cement slurry are used in step (c) to determine experimentally the rheology of the proposed cement slurry versus salt dissolution curve, and
wherein the rheology parameters are selected from the group consisting of plastic viscosity, Bingham model yield point, Herschel-Bulkley model parameters, and any combination thereof.

10. The method of claim 1, further comprising a wellhead with a tubular extending therefrom and into the wellbore, and a pump fluidly coupled to the tubular; and wherein
step (n) is performed by introducing the final cement slurry into the wellbore through the tubular.

11. A method comprising:
(a) calculating a theoretical first wellbore radius in a subterranean salt formation having a treatment fluid therein based on salt creep analysis in the presence of formation-treatment fluid;
(b) calculating a theoretical second wellbore radius in the subterranean salt formation during a cementing operation with a proposed cement slurry based on salt creep analysis in the presence of formation-cement slurry,
wherein the cementing operation involves forming a proposed cement sheath within the wellbore, and wherein the proposed cement sheath must withstand a wellbore load to prevent failure of the cement sheath in the wellbore;
(c) determining experimentally a rheology of the proposed cement slurry versus salt dissolution curve;
(d) calculating a maximum salt dissolution value based on thermodynamic salt dissolution;
(e) calculating a theoretical final wellbore radius in the subterranean salt formation based on the theoretical first wellbore radius, the theoretical second wellbore radius, and salt dissolution expected after the proposed cement sheath is theoretically formed;
(f) calculating theoretically whether the proposed cement sheath is capable of withstanding the wellbore load by calculating theoretical thermal and thermo-mechanical properties of the proposed cement slurry based on salt creep analysis in the presence of formation-cement sheath;
(g) determining experimentally whether the proposed cement sheath is capable of withstanding the wellbore load based on an ultrasonic cement analyzer test and actual thermal and thermo-mechanical properties of the proposed cement slurry after salt dissolution;
(h) calculating theoretically a theoretical pump time and a theoretical pump pressure for the treatment fluid and the proposed cement slurry based on a computational fluid dynamics model,
wherein the theoretical pump pressure for the treatment fluid and the proposed cement slurry is between a pore pressure and a fracture gradient of the subterranean salt formation, and
wherein the theoretical pump time for the treatment fluid and the proposed cement slurry is such that the proposed cement slurry will theoretically permit formation of the proposed cement sheath in the wellbore without substantial premature curing;
(i) determining experimentally whether the theoretical pumping time for the treatment fluid and the proposed cement slurry will permit formation of the proposed cement sheath in the wellbore without substantial premature curing based on a thickening time test of the proposed cement slurry;
(j) performing steps (f)-(g) before steps (h)-(i), or performing steps (h)-(i) before steps (f)-(g);
(k) establishing a final cement slurry, a final pumping pressure and time for the treatment fluid, and a final pumping pressure and time for the cement slurry;
(l) performing a wellbore operation with the treatment fluid using the final pumping time and pressure for the treatment fluid; and
(m) performing the cementing operation with the final cement slurry using the final pumping time and pressure for the final cement slurry.

12. The method of claim 11, wherein step (j) comprises performing (f)-(g) before steps (h)-(i), and
further comprising manipulating the proposed cement slurry after at least one of:
step (f), and repeating steps (b)-(f) until the proposed cement sheath based on the proposed cement slurry that has been manipulated is theoretically capable of withstanding the wellbore load,
step (g), and repeating steps (b)-(g) until the proposed cement sheath based on the proposed cement slurry that has been manipulated is experimentally capable of withstanding the wellbore load,
step (h), and repeating steps (b)-(h) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing, and
step (i), and repeating steps (b)-(i) until the theoretical pumping time experimentally permits formation of the proposed cement sheath in the wellbore with the proposed cement slurry that has been manipulated without substantial premature curing.

13. The method of claim 11, wherein step (j) comprises performing steps: (h)-(i) before steps: (f)-(g), and
further comprising manipulating the proposed cement slurry after at least one of:
step (h), and repeating steps (b)-(e) and (h) until the theoretical pumping pressure for the treatment fluid and the proposed cement slurry that has been manipulated is theoretically between the pore pressure and the fracture gradient of the subterranean salt formation and the theoretical pumping time for the treatment fluid and the proposed cement slurry that has been manipulated theoretically permits formation of the proposed cement sheath with the proposed cement slurry that has been manipulated in the wellbore without substantial premature curing,
step (i), and repeating steps (b)-(e) and (h)-(i) until the theoretical pumping time experimentally permits formation of the proposed cement sheath in the wellbore with the proposed cement slurry that has been manipulated without substantial premature curing,
step (f), and repeating steps (b)-(e), (h)-(i), and (f) until the proposed cement sheath based on the proposed cement slurry that has been manipulated is theoretically capable of withstanding the wellbore load, and
step (g), and repeating steps (b)-(e), (h)-(i), and (f)-(g) until the proposed cement sheath based on the proposed cement slurry that has been manipulated is experimentally capable of withstanding the wellbore load.

14. The method of claim 11, wherein the computational fluid dynamics model of step (h) is used to determine the theoretical pump time and pressure of the treatment fluid and the proposed cement slurry based on: a flow rate of the treatment fluid, a flow rate of the proposed cement slurry, a rheology of the treatment fluid, a rheology of the proposed cement slurry, a standoff profile, and the theoretical final wellbore radius.

15. The method of claim 14, wherein at least one of the flow rate of the treatment fluid and the flow rate of the cement slurry are manipulated and step (h) is repeated.

16. The method of claim 14, wherein the rheology parameters of the treatment fluid and the rheology parameters of the proposed cement slurry are selected from the group consisting of plastic viscosity, Bingham model yield point, Herschel-Bulkley model parameters, and any combination thereof.

17. The method of claim 11, wherein the theoretical thermal and thermo-mechanical properties of the proposed cement slurry are calculated based on at least one of thermal conductivity, thermal diffusivity, tensile strength, compressive strength, hydration volume change, Young's modulus, and Poisson's ratio.

18. The method of claim 11, wherein the salt creep analysis is based on secondary salt creep; a combination of secondary salt creep and tertiary salt creep; or a combination of primary salt creep, secondary salt creep, and tertiary salt creep.

19. The method of claim 11, wherein rheology parameters of the proposed cement slurry are used in step (c) to determine experimentally the rheology of the proposed cement slurry versus salt dissolution curve, and wherein the rheology parameters are selected from the group consisting of plastic viscosity, Bingham model yield point, Herschel-Bulkley model parameters, and any combination thereof.

20. The method of claim 11, further comprising a wellhead with a tubular extending therefrom and into the wellbore, and a pump fluidly coupled to the tubular; and wherein step (m) is performed by introducing the final cement slurry into the wellbore through the tubular.

* * * * *